United States Patent
Shin et al.

(10) Patent No.: US 10,272,735 B2
(45) Date of Patent: Apr. 30, 2019

(54) INDIVIDUAL AIR CONDITIONING APPARATUS FOR VEHICLE AND METHOD OF CONTROLLING THE SAME

(71) Applicants: Hyundai Motor Company, Seoul (KR); Hanon Systems, Daejeon (KR); Doowon Climate Control Co., Ltd., Asan, Chungcheongnam-do (KR)

(72) Inventors: Gee Young Shin, Gyeonggi-do (KR); Sang Shin Lee, Gyeonggi-do (KR); Kwang Woon Cho, Gyeonggi-do (KR); Dong Ho Kwon, Gyeongsangbuk-do (KR); Keon Soo Jin, Ulsan (KR); Dae Ig Jung, Gyeonggi-do (KR); In Hyeok Kim, Daejeon (KR); Sang In Suk, Chungcheongnam-do (KR)

(73) Assignees: Hyundai Motor Company, Seoul (KR); Hanon Systems, Daejeon (KR); Doowon Climate Control Co., Ltd., Asan, Chungcheongnam-do (KR)

( * ) Notice: Subject to any disclaimer, the term of this patent is extended or adjusted under 35 U.S.C. 154(b) by 107 days.

(21) Appl. No.: 15/291,757

(22) Filed: Oct. 12, 2016

(65) Prior Publication Data
US 2017/0326940 A1 Nov. 16, 2017

(30) Foreign Application Priority Data
May 10, 2016 (KR) .................. 10-2016-0056954

(51) Int. Cl.
*B60H 1/00* (2006.01)
*B60H 1/08* (2006.01)
*B60S 1/02* (2006.01)

(52) U.S. Cl.
CPC ........... *B60H 1/00064* (2013.01); *B60H 1/08* (2013.01); *B60S 1/026* (2013.01); *B60H 1/00842* (2013.01);
(Continued)

(58) Field of Classification Search
CPC .. B60H 1/00064; B60H 1/08; B60H 1/00842; B60H 2001/00092; B60H 1/00007;
(Continued)

(56) References Cited

U.S. PATENT DOCUMENTS 4,681,153 A * 7/1987 Uchida ............. B60H 1/00842
165/103
4,730,662 A * 3/1988 Kobayashi ......... B60H 1/00828
165/204

(Continued)

FOREIGN PATENT DOCUMENTS

JP 2003-252026 A 9/2003
JP 2006-248288 A 9/2006
(Continued)

*Primary Examiner* — Justin M Jonaitis
(74) *Attorney, Agent, or Firm* — Mintz Levin Cohn Ferris Glovsky and Popeo, P.C.; Peter F. Corless (57) ABSTRACT

An individual air conditioning apparatus for a vehicle includes: a driver's seat air conditioning module and a passenger seat air conditioning module sequentially provided with an evaporation core and a heater core; a first channel that passes through the evaporation core and is connected to an indoor outlet; a second channel that passes through the evaporation core and the heater core and is connected to the indoor outlet; and a temperature control door that opens and closes the first channel and the second channel.

7 Claims, 10 Drawing Sheets

(52) U.S. Cl.
CPC .............. *B60H 2001/00092* (2013.01); *B60H 2001/00192* (2013.01)

(58) Field of Classification Search
CPC .................. B60H 1/00035; B60H 3/02; B60H 2001/00185; B60H 1/00; B60H 2001/0015; B60S 1/026; B61D 27/00
USPC ............ 165/42, 41, 204, 200, 202, 203, 205
See application file for complete search history.

(56) References Cited

U.S. PATENT DOCUMENTS

| | | | | |
|---|---|---|---|---|
| 5,199,485 | A * | 4/1993 | Ito | B60H 1/00007 165/203 |
| 6,175,782 | B1 * | 1/2001 | Obradovich | B60G 17/0195 165/11.1 |
| 6,453,991 | B1 * | 9/2002 | Tsurushima | B60H 1/00064 165/202 |
| 2011/0005708 | A1 * | 1/2011 | Seto | B60H 1/00064 165/41 |
| 2011/0284298 | A1 * | 11/2011 | Ajisaka | B60H 1/00535 180/65.21 |
| 2014/0217080 | A1 * | 8/2014 | Hoke | B60H 1/00785 219/203 |
| 2014/0373563 | A1 * | 12/2014 | Mizutani | B60H 1/00807 62/186 |
| 2017/0136842 | A1 * | 5/2017 | Anderson | B60G 17/016 |

FOREIGN PATENT DOCUMENTS

| | | |
|---|---|---|
| JP | 2009-090873 A | 4/2009 |
| KR | 2008-0076219 A | 8/2008 |
| KR | 10-2014-0110535 A | 9/2014 |
| KR | 2016-0006303 A | 1/2016 |

* cited by examiner

INDIVIDUAL AIR CONDITIONING APPARATUS FOR VEHICLE AND METHOD OF CONTROLLING THE SAME

CROSS REFERENCE TO RELATED APPLICATION

The present application claims under 35 U.S.C. § 119(a) the benefit of Korean Patent Application No. 10-2016-0056954, filed on May 10, 2016, the entire contents of which are incorporated by reference herein.

BACKGROUND

1. Technical Field

The present invention relates to an air conditioning apparatus for a vehicle, and more particularly, to an individual air conditioning apparatus configured to individually control air conditioning to a driver's seat and/or a passenger seat.

2. Description of the Related Art

A vehicle is provided with an air conditioning system for cooling and heating an interior of a vehicle. A main goal of the air conditioning system is to keep an indoor temperature of a vehicle pleasant at all times.

A cooler in the air conditioning system includes a compressor compressing a refrigerant, a condenser condensing the refrigerant compressed by the compressor, an expansion value making a refrigerant liquefied by being condensed by the condenser into a low-temperature and low-pressure state, and an evaporator using latent heat of evaporation of the refrigerant to cool air, and so on, as components. Generally, the cooling system lowers a temperature of air and controls absolute humidity.

When cooling water for cooling heat of an engine room takes the heat from an engine in a high temperature state, a heating system uses the high-temperature cooling water as a heat source and is configured to include a heater core and a pump for circulating the cooling water of the engine. Generally, the heating system increases a temperature of air and controls relative humidity.

However, in the case of an eco-friendly vehicle using electricity as a power source, electricity is used as an energy source for an operation of the compressor including a motor and for all apparatuses such as a PTC element for replacing the engine cooling water. Meanwhile, since a battery takes full charge of electricity and consumption of the battery has a direct connection with mileage of a vehicle, the greatest concern is to reduce energy consumption of various apparatuses.

For example, when only a driver gets in a vehicle, an individual air conditioning system for air-conditioning air around a driver's seat to reduce energy consumption has been proposed.

The matters described as the related art have been provided only for assisting in the understanding for the background of the present invention and should not be considered as corresponding to the related art known to those skilled in the art.

SUMMARY

An air conditioning apparatus according to the present invention is capable of performing individual air conditioning for occupant(s) of a vehicle, and in particular, is directed to an air conditioning apparatus for a vehicle and a method of controlling the same capable of reducing dew condensation occurring on a window even when the individual air conditioning is performed by distributing an air volume to a driver's seat and a passenger seat.

According to an exemplary embodiment of the present invention, there is provided an individual air conditioning apparatus for a vehicle, including: a driver's seat air conditioning module configured to be provided with a driver's seat air conditioning duct and have one side provided with a driver's seat side inlet and another side provided with a driver's seat side indoor outlet, the driver's seat side inlet being sequentially provided with an evaporation core and a heater core; a passenger seat air conditioning module configured to be provided with a passenger seat air conditioning duct and have one side provided with a passenger seat side inlet and another side provided with a passenger seat side indoor outlet, the passenger seat side inlet being sequentially provided with the evaporation core and the heater core; a first channel configured to pass through the evaporation core to be connected to the indoor outlet; a second channel configured to pass through the evaporation core and the heater core to be connected to the indoor outlet; and a temperature control door configured to open or close the first channel and the second channel.

The driver's seat side indoor outlet and the passenger seat side indoor outlet may be configured to include a defroster (DEF) outlet, a vent outlet, and a floor outlet.

The individual air conditioning apparatus for a vehicle may further include: an air guide configured to be positioned at the DEF outlet at the driver's seat side and extend in a direction in which a channel of the DEF outlet is reduced.

The individual air conditioning apparatus for a vehicle may further include: a door controller configured to control a temperature control door, in which the door controller may control the first channel and the second channel of the passenger seat side to be closed when receiving an individual air conditioning signal.

The individual air conditioning apparatus for a vehicle may further include: a mode door configured to open and close the DEF outlet, in which the door controller may increase an open value of the mode door when receiving the individual air conditioning signal and an operation signal of a floor mode or a mix mode.

According to another exemplary embodiment of the present invention, there is provided a method of controlling an individual air conditioning apparatus for a vehicle, including steps of: sensing, by a controller, an individual air conditioning operation signal; determining, by the controller, whether the air conditioning apparatus is operated in a defroster (DEF) mode if it is determined that the individual air conditioning signal is sensed; and releasing, by the controller, an individual air conditioning operation if it is determined that the air conditioning apparatus is operated in the DEF mode.

The method may further include steps of: determining, by the controller, whether the air conditioning apparatus is operated in the floor mode or the mix mode if it is determined that the air conditioning apparatus is not operated in the DEF mode; and controlling, by the controller, the mode door where if it is determined that the air conditioning apparatus is operated in the floor mode or the mix mode, the mode door may be controlled to increase the open value.

According to another exemplary embodiment of the present invention, a non-transitory computer readable medium containing program instructions executed by a processor includes: program instructions that sense an individual air conditioning operation signal; program instructions that determine whether an air conditioning apparatus is operated in a defroster (DEF) mode if it is determined that the individual air conditioning operation signal is sensed; and program instructions that release an individual air conditioning operation if it is determined that the air conditioning apparatus is operated in the DEF mode.

DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present invention will be described with reference to the accompanying drawings.

Figure 1:
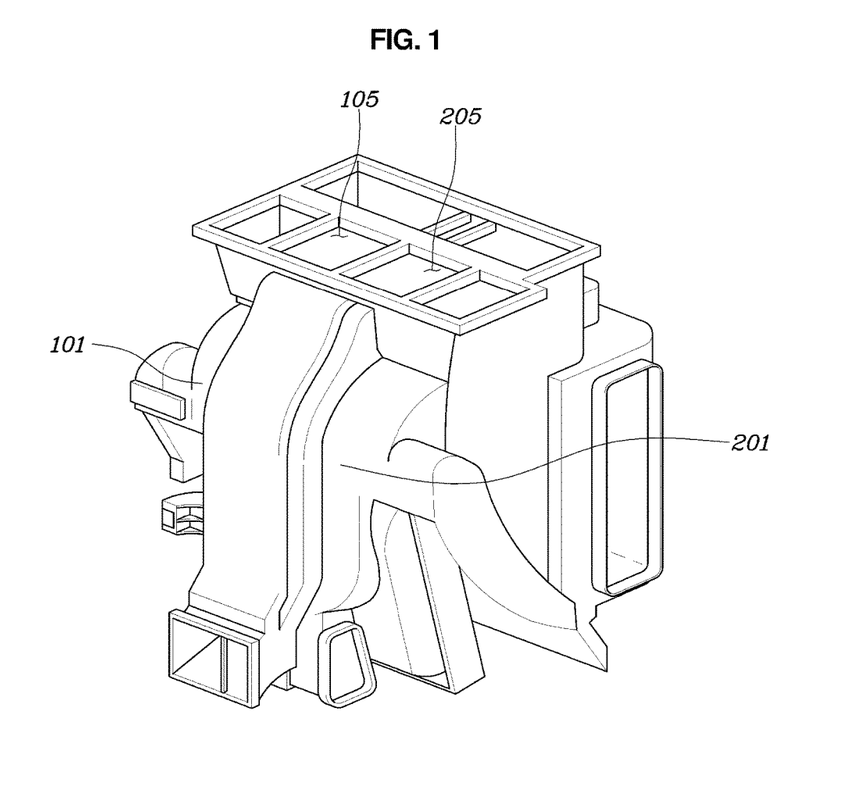
FIG. 1 is a perspective view of an individual air conditioning apparatus for a vehicle according to an exemplary embodiment of the present invention.
Figure 2:
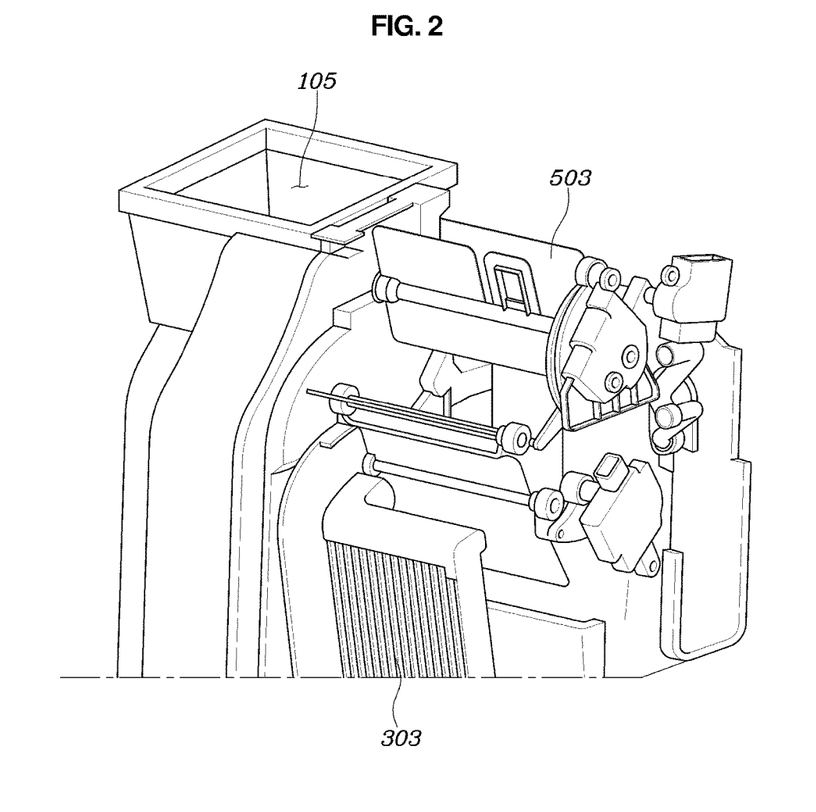
FIG. 2 is a diagram illustrating an inside of an air conditioning module of a passenger seat of the individual air conditioning apparatus for a vehicle according to the exemplary embodiment of the present invention.
Figure 3:
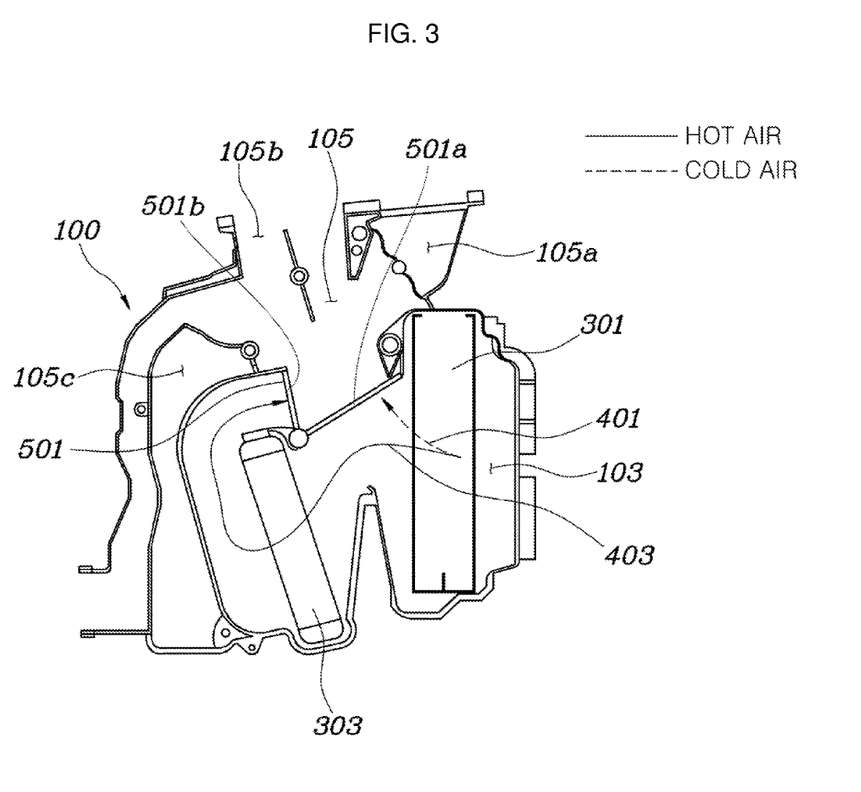
FIG. 3 is a diagram illustrating a temperature control door of the individual air conditioning apparatus for a vehicle according to the exemplary embodiment of the present invention stops a first channel and a second channel.

FIG. 1 is a perspective view of an individual air conditioning apparatus for a vehicle according to an exemplary embodiment of the present invention, FIG. 2 is a diagram illustrating an inside of a passenger seat air conditioning module 200 of the individual air conditioning apparatus for a vehicle according to the exemplary embodiment of the present invention, and FIG. 3 is a diagram illustrating a temperature control door 501 of the individual air conditioning apparatus for a vehicle according to the exemplary embodiment of the present invention stops a first channel 401 and a second channel 403.

Figure 4:
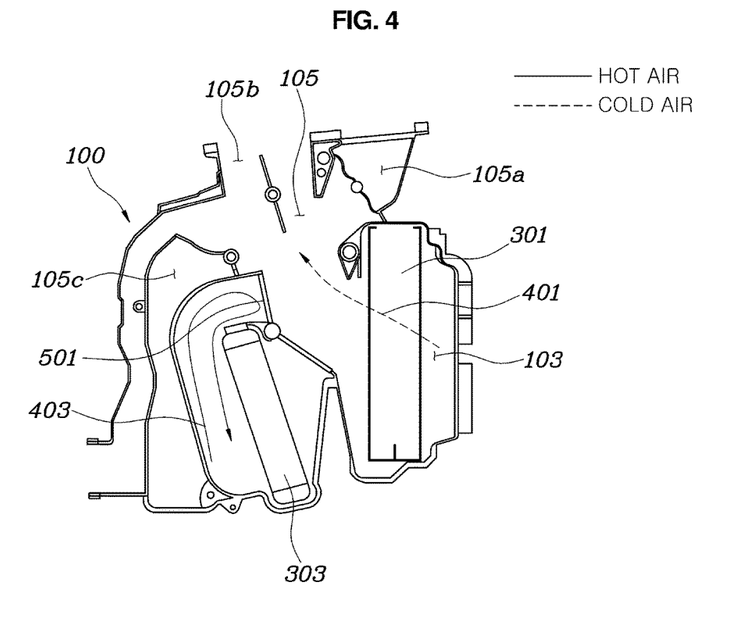
FIG. 4 is a diagram illustrating a cooling mode of the individual air conditioning apparatus for a vehicle according to the exemplary embodiment of the present invention.
Figure 5:
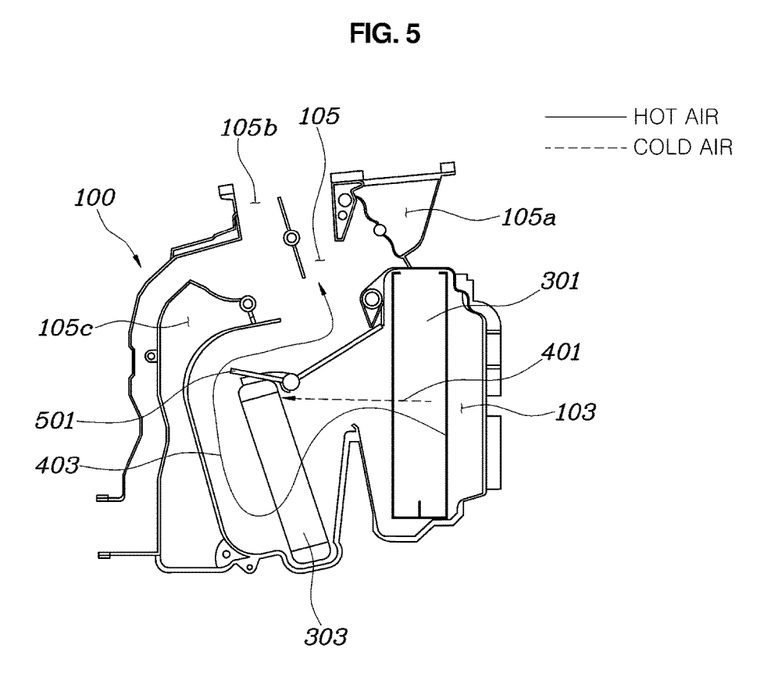
FIG. 5 is a diagram illustrating a heating mode of the individual air conditioning apparatus for a vehicle according to the exemplary embodiment of the present invention.
Figure 6:
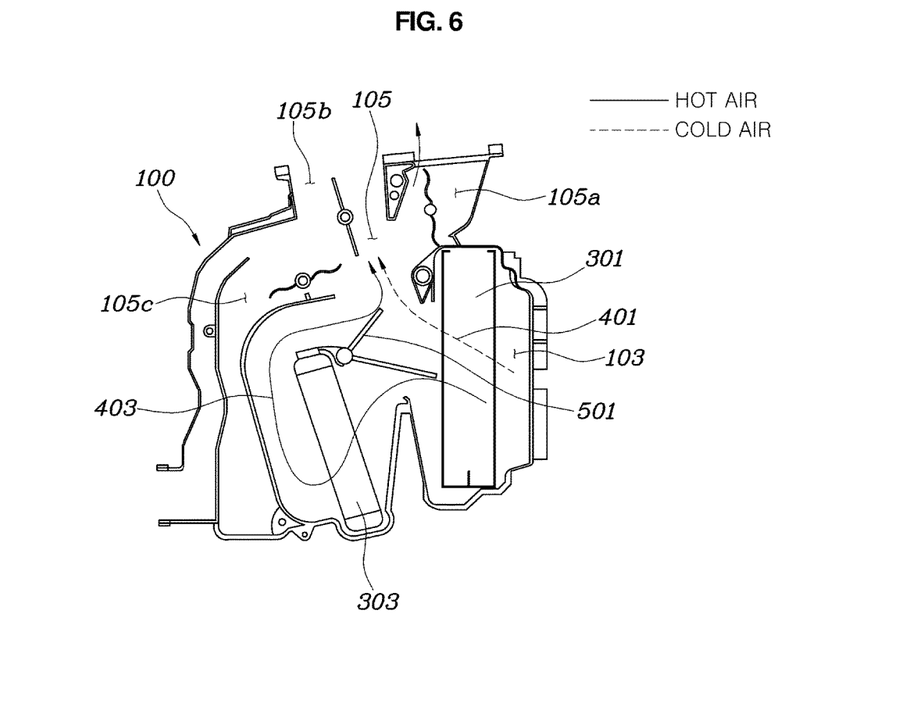
FIG. 6 is a diagram illustrating a temperature control mode of the individual air conditioning apparatus for a vehicle according to the exemplary embodiment of the present invention.

FIG. 4 is a diagram illustrating a cooling mode of the individual air conditioning apparatus for a vehicle according to the exemplary embodiment of the present invention, FIG. 5 is a diagram illustrating a heating mode of the individual air conditioning apparatus for a vehicle according to the exemplary embodiment of the present invention, and FIG. 6 is a diagram illustrating a temperature control mode of the individual air conditioning apparatus for a vehicle according to the exemplary embodiment of the present invention.

Figure 7:
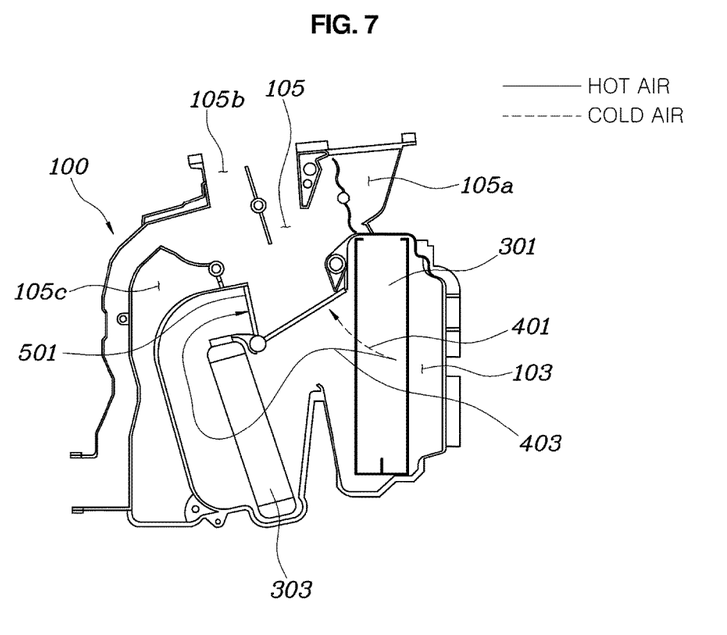
FIGS. 7 and 8 are diagrams illustrating a control of an open value of a mode door in an individual air conditioning mode of the individual air conditioning apparatus for a vehicle according to the exemplary embodiment of the present invention.
Figure 8:
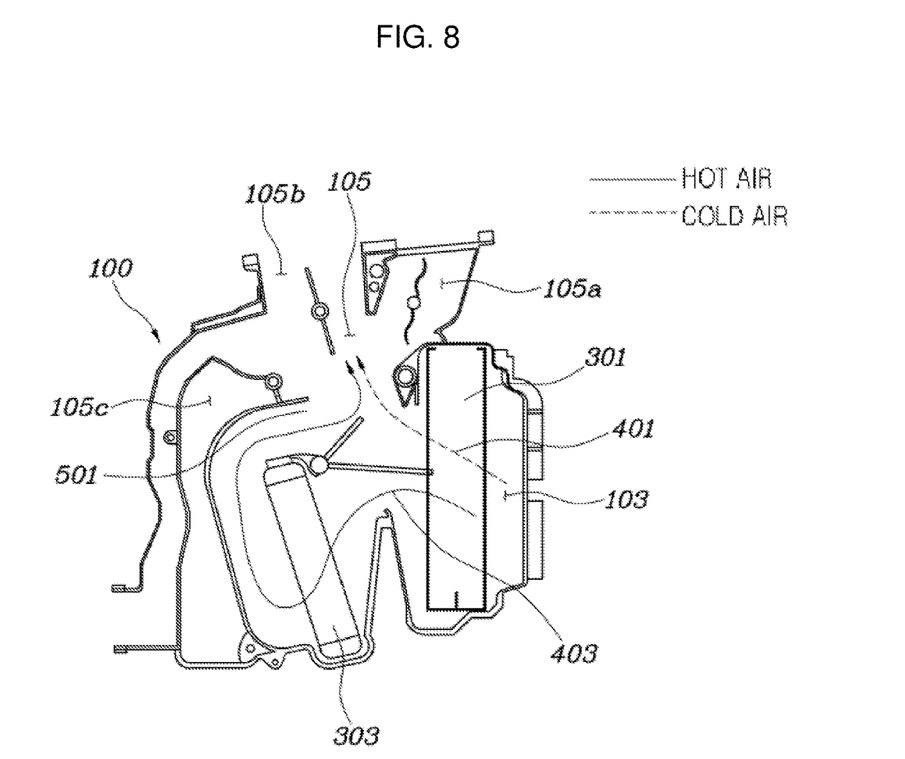
Figure 9:
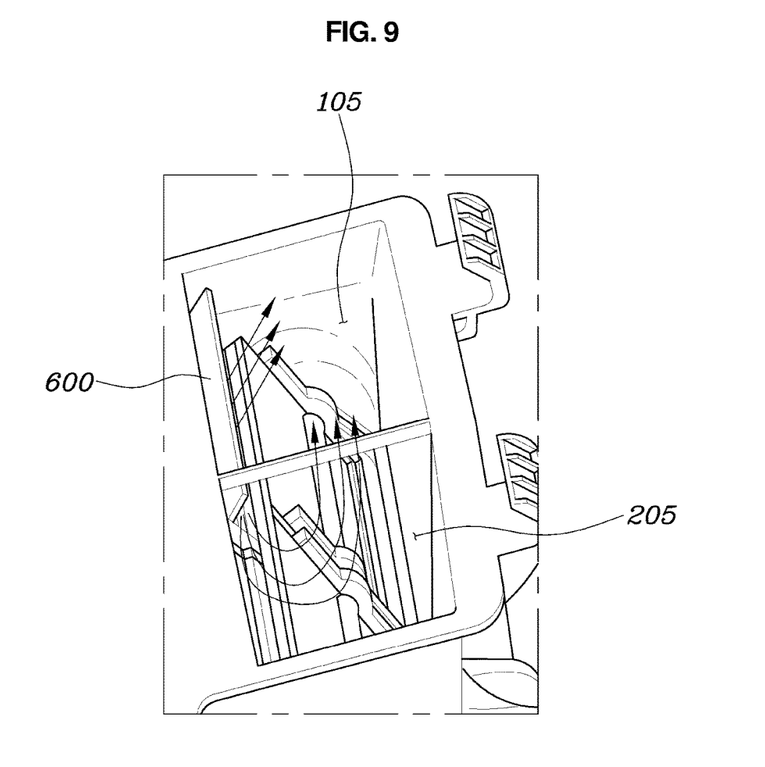
FIG. 9 is a diagram illustrating an air guide of the individual air conditioning apparatus for a vehicle according to the exemplary embodiment of the present invention.
Figure 10:
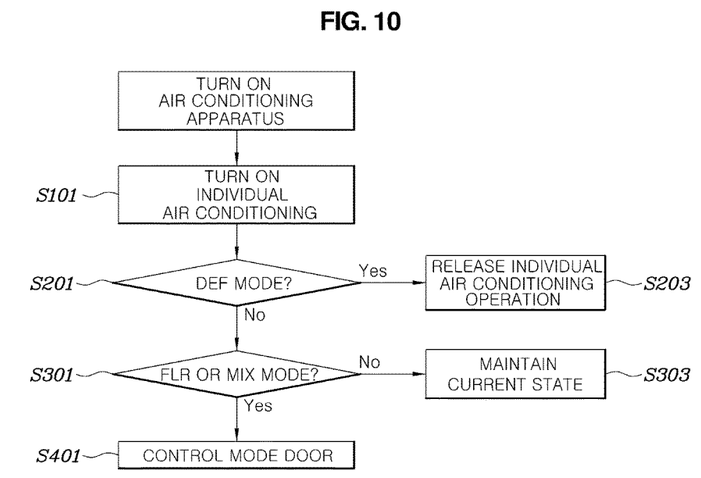
FIG. 10 is a flow chart of a method of controlling an individual air conditioning apparatus for a vehicle according to an exemplary embodiment of the present invention.

FIGS. 7 and 8 are diagrams illustrating a control of an open value of a mode door 503 in an individual air conditioning mode of the individual air conditioning apparatus for a vehicle according to the exemplary embodiment of the present invention, FIG. 9 is a diagram illustrating an air guide of the individual air conditioning apparatus for a vehicle according to the exemplary embodiment of the present invention, and FIG. 10 is a flow chart of a method of controlling an individual air conditioning apparatus for a vehicle according to an exemplary embodiment of the present invention.

An individual air conditioning apparatus for a vehicle according to an exemplary embodiment of the present invention may include: a driver's seat air conditioning module 100 configured to be provided with a driver's seat air conditioning duct 101 and have one side provided with a driver's seat side inlet 103 and another side provided with a driver's seat side indoor outlet 105, in which the driver's seat side inlet 103 is sequentially provided with an evaporation core 301 and a heater core 303; a passenger seat air conditioning module 200 configured to be provided with a passenger seat air conditioning duct 201 and have one side provided with a passenger seat side inlet 203 and another side provided with a passenger seat side indoor outlet 205, in which the passenger seat side inlet 203 is sequentially provided with the evaporation core 301 and the heater core 303; a first channel 401 configured to pass through the evaporation core 310 to be connected to the indoor outlet; a second channel 403 configured to pass through the evaporation core 301 and the heater core 303 to be connected to the indoor outlet; and a temperature control door 501 configured to open or close the first channel 401 and the second channel 403.

The individual air conditioning apparatus further includes a door controller configured to control the temperature control door 501 (e.g., a first temperature control door 501a and a second temperature control door 501b that pivot on a same rotational axis), in which the door controller may control the first channel 401 and the second channel 403 of the passenger seat side to be closed when receiving an individual air conditioning signal.

Referring to FIGS. 1 and 2, the individual air conditioning apparatus is divided into the driver's seat side and the passenger seat side by a partition wall. In this case, the driver's seat air conditioning module 100 mainly serves to supply air-conditioned air to the driver's seat side, and the passenger seat air conditioning module 200 mainly serves to supply the air-conditioned air to the passenger seat side. Unless separately described, the driver's seat air conditioning module 100 and the passenger seat air conditioning module 200 are symmetrical to each other with respect to the partition wall. Accordingly, a cross section illustrated in FIGS. 3 to 8 may be commonly applied to the driver's seat air conditioning module 100 or the passenger seat air conditioning module 200. Further, the description of the exemplary embodiment of the present invention relates to the driver's seat air conditioning module, which may also be applied to the passenger seat air conditioning module.

Regarding the configuration of the individual air conditioning apparatus according to the exemplary embodiment of the present invention, in the case of the driver's seat air conditioning module 100, one side of the driver's seat air conditioning duct 101 is provided with the driver's seat side inlet 103 to be introduced with outdoor air and another side thereof is provided with the indoor side outlet to supply the air-conditioned air to the interior of the vehicle. The inside of the driver's seat air conditioning duct 101 may be provided with the evaporation core 301 and the heater core 303. The evaporation core 301 and the heater core 303 may be separately provided in the driver's seat air conditioning module and the passenger seat air conditioning module, respectively, and may also be provided to be commonly used by passing through the partition wall.

The channel through which the air introduced through the driver's seat side inlet 103 is configured to largely include a first channel 401 and a second channel 403. The first channel 401 is a path through which air which is cooled by passing through the evaporation core 301 to have low absolute humidity moves to the indoor outlet. The second channel 403 is a path through which air passing through the evaporation core 301 which is heated by passing through the heater core 303 to have low relative humidity moves to the indoor outlet.

A method of performing individual air conditioning by the individual air conditioning apparatus for a vehicle according to the exemplary embodiment of the present invention uses the temperature control door 501 to close the first channel 401 and the second channel 403. Referring to FIGS. 4 to 6, the temperature control door 501 closes the first channel 401 and opens the second channel 403 to operate the individual air conditioning apparatus in a heating mode or opens the first channel 410 and closes the second channel 403 to operate the individual air conditioning apparatus in a cooling mode. Alternatively, the individual air conditioning apparatus is operated in a temperature control mode which partially opens the first channel 401 and the second channel 403 to mix cold air and hot air.

However, according to the exemplary embodiment of the present invention, as illustrated in FIG. 3, to perform the individual air conditioning, both of the first channel 401 and the second channel 403 at the passenger seat air conditioning module 200 are closed using the temperature control door 501 mounted in the passenger seat air conditioning module 200 to perform a control to supply the air-conditioned air only to the driver's seat side and not to supply the air-conditioned air to the passenger seat side, thereby performing the individual air conditioning. Similarly, if both of the first channel 401 and the second channel 403 at the driver's seat air conditioning module 100 are closed by the temperature control door 501 mounted in the driver's seat air conditioning module 100, the air-conditioned air may be supplied only to the passenger seat side.

The driver's seat side indoor outlet 105 and the passenger seat side indoor outlet 205 may be configured to include a DEF outlet 105a, a vent outlet 105b, and a floor outlet 105c.

The individual air conditioning apparatus further includes a mode door 503 configured to open and close the DEF outlet 105a, in which the door controller may increase an open value of the mode door 503 when receiving the individual air conditioning signal and an operation signal of a floor mode or a mix mode.

The individual air conditioning apparatus may further include an air guide 600 configured to be positioned at the DEF outlet 105a at the driver's seat side and extend in a direction in which a channel of the DEF outlet 105a is reduced.

A path through which the air-conditioned air is supplied to the interior of the vehicle is largely divided into three of the DEF outlet 105a, the vent outlet 105b, and the floor outlet 105c. The DEF outlet 105a is connected to a lower end side of a windshield glass to supply air to the windshield glass, thereby removing moisture formed on a window. The vent outlet 105b is typically positioned at a front surface of the interior of the vehicle to air-condition an indoor space of an upper body of a passenger and the floor outlet 105c air-conditions an indoor space of a lower body of a passenger.

A DEF mode of the air conditioning apparatus is a mode to control air to be supplied through the DEF outlet 105a, a vent mode is a mode to control air to be supplied through the vent outlet 105b, and a floor mode is a mode to control air to be supplied through the floor outlet 105c. A bi-level mode is a mode to control air to be supplied from both of the vent outlet 105b and the floor outlet 105c and the mix mode is a mode to control air to be supplied from both of the DEF outlet 105a and the floor outlet 105c. The control of each mode is performed through opening and closing of the mode door provided at each outlet side. However, the exemplary embodiment of the present invention mainly describes the mode door 503 positioned at the DEF outlet 105a.

The individual air conditioning apparatus according to the exemplary embodiment of the present invention uses the temperature control door 501 at the passenger seat side upon the operation of the individual air conditioning mode to close both of the first channel 401 and the second channel 403 to thereby control air not to be supplied through the passenger seat side indoor outlet 205. In this case, when moisture occurs on the windshield glass and thus air needs to be supplied through the DEF outlet 105*a*, air is not supplied through the passenger seat side, and therefore the moisture of the windshield glass at the passenger seat side may not be removed. Therefore, according to the exemplary embodiment of the present invention, as illustrated in FIGS. 7 and 8, the open value of the mode door 503 of the DEF outlet 105*a* at the driver's seat side is first increased to increase an air flow. Further, the DEF outlet 105*a* opens the partition wall of the driver's seat and the passenger seat as illustrated in FIG. 9 to pass the air of the driver's seat side to the passenger seat side and the DEF outlet 105*a* at the driver's seat side is provided with the air guide 600 to make the DEF outlet 105*a* relatively narrower to increase a pressure of the DEF outlet 105*a* to pass some air to the DEF outlet 105*a* at the passenger seat side. By this configuration, the occurrence of moisture of the windshield glass is prevented by securing the air supply rate through the DEF outlet 205*a* at the passenger seat side in the individual air conditioning mode.

The method of controlling an individual air conditioning apparatus includes: an air conditioning signal sensing step (S101) of sensing an individual air conditioning operation signal; a first mode determining step (S201) of determining whether the air conditioning apparatus is operated in the DEF mode if it is determined in the air conditioning signal sensing step (S101) that the individual air conditioning signal is sensed; and a step (S203) of releasing an individual air conditioning operation if it is determined in the first mode determining step (S201) that the air conditioning apparatus is operated in the DEF mode. The above steps preferably are performed by a controller of the vehicle.

Even though energy is saved by performing the individual air conditioning, any such energy savings may not be more important than the creation of a safe driving environment for a driver and other vehicle occupants. Therefore, even though the individual air conditioning is operated, when operation of the DEF mode that focuses on the removal of humidity of the windshield glass is sensed, the individual air conditioning operation is released, and air is supplied through both of the DEF outlets 105*a* and 205*a* at the driver's seat side and the passenger seat side.

The method of controlling an individual air conditioning apparatus further includes: a second mode determining step (S301) of determining whether the air conditioning apparatus is operated in the floor mode or the mix mode if it is determined in the first mode determining step (S201) that the air conditioning apparatus is not operated in the DEF mode and a mode door control step (S401) of controlling the mode door 503, in which if it is determined in the second mode determining step (S301) that the air conditioning apparatus is operated in the floor mode or the mix mode, the mode door 503 may be controlled to increase the open value.

To delay the occurrence of moisture of the windshield glass, the floor mode among the operation modes of the air conditioning apparatus described above controls some air to be supplied to the DEF outlets 105*a* and 205*a*. In this case, it may be difficult to supply air to the DEF outlet 205*a* at the passenger seat side through the passenger seat air conditioning duct 201 due to the operation of the individual air conditioning mode, and therefore the control to increase the open value of the mode door 503 of the DEF outlet 105*a* at the driver's seat side to supply some air to the DEF outlet 205*a* at the passenger seat side is performed.

By doing so, it is possible to prevent moisture from occurring on the windshield glass at the passenger seat side even though the individual air conditioning is performed.

As described above, according to the individual air conditioning apparatus for a vehicle and a method of controlling the same in accordance with the present invention, it is possible to implement an individual air conditioning system for a driver and a passenger without increasing costs and to delay the occurrence of dew condensation on the window of the passenger seat occurring when the individual air conditioning is performed.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. An individual air conditioning apparatus for a vehicle, comprising:
    a driver's seat air conditioning module configured to be provided with a driver's seat air conditioning duct and have one side provided with a driver's seat side inlet and another side provided with a driver's seat side indoor outlet, the driver's seat side inlet being sequentially provided with an evaporation core and a heater core;
    a passenger seat air conditioning module configured to be provided with a passenger seat air conditioning duct and have one side provided with a passenger seat side inlet and another side provided with a passenger seat side indoor outlet, the passenger seat side inlet being sequentially provided with the evaporation core and the heater core;
    a partition separating the driver's seat air conditioning module and the passenger seat air conditioning module;
    a first channel configured to pass through the evaporation core to be connected to the indoor outlet;
    a second channel configured to pass through the evaporation core and the heater core to be connected to the indoor outlet;
    a first temperature control door configured to open or close the first channel; and a second temperature control door configured to open or close the second channel, wherein the first temperature control door and the second temperature control door pivot on a same rotational axis,
    wherein the driver's seat side indoor outlet includes a defroster (DEF) outlet at a driver's seat side, and the passenger seat side indoor outlet includes a defroster (DEF) outlet at a passenger seat side,
    wherein the partition between the DEF outlet at the driver's seat side and the DEF outlet at the passenger seat side is open, such that air at the driver's seat side flows to the passenger seat side, and
    wherein an air guide Is positioned at the DEF outlet at the driver's seat side and extends in a direction in which a channel of the DEF outlet at the driver's seat side is reduced to increase pressure of air discharged from the DEF outlet at the driver's seat side.

2. The individual air conditioning apparatus of claim 1, wherein the driver's seat side indoor outlet and the passenger seat side indoor outlet further include a vent outlet and a floor outlet.

3. The individual air conditioning apparatus of claim 2, further comprising:
- a door controller configured to control a temperature control door,
- wherein the door controller controls the first channel and the second channel of the passenger seat side to be closed when receiving an individual air conditioning signal.

4. The individual air conditioning apparatus of claim 3, further comprising:
- a mode door configured to open and close the DEF outlet,
- wherein the door controller increases an open value of the mode door when receiving the individual air conditioning signal and an operation signal of a floor mode or a mix mode.

5. A method of controlling the individual air conditioning apparatus for a vehicle of claim 1, comprising the steps of:
- an individual air conditioning operation, by a controller, for supplying air-conditioned air to only either one of a driver's seat side and a passenger seat side of the vehicle;
- sensing, by the controller, an individual air conditioning operation signal;
- determining, by the controller, whether the air conditioning apparatus is operated in a defroster (DEF) mode if it is determined that the individual air conditioning operation signal is sensed; and
- releasing, by the controller, the individual air conditioning operation for supplying the air-conditioned air to both of the driver's seat side and the passenger seat side of the vehicle, if it is determined that the air conditioning apparatus is operated in the DEF mode.

6. The method of claim 5, further comprising the steps of:
- determining, by the controller, whether the air conditioning apparatus is operated in a floor mode or a mix mode if it is determined that the air conditioning apparatus is not operated in the DEF mode; and
- controlling, by the controller, a mode door,
- wherein if it is determined that the air conditioning apparatus is operated in the floor mode or the mix mode, the mode door is controlled to increase an open value.

7. A non-transitory computer readable medium containing program instructions executed by a processor for controlling the individual air conditioning apparatus of claim 1, the computer readable medium comprising:
- program instructions that execute an individual air conditioning operation for supplying air-conditioned air to only either one of a driver's seat side and a passenger seat side of a vehicle;
- program instructions that sense an individual air conditioning operation signal;
- program instructions that determine whether an air conditioning apparatus is operated in a defroster (DEF) mode if it is determined that the individual air conditioning operation signal is sensed; and
- program instructions that release the individual air conditioning operation for supplying the air-conditioned air to both of the driver's seat side and the passenger seat side of the vehicle, if it is determined that the air conditioning apparatus is operated in the DEF mode.

* * * * *